Figures 4, 5:
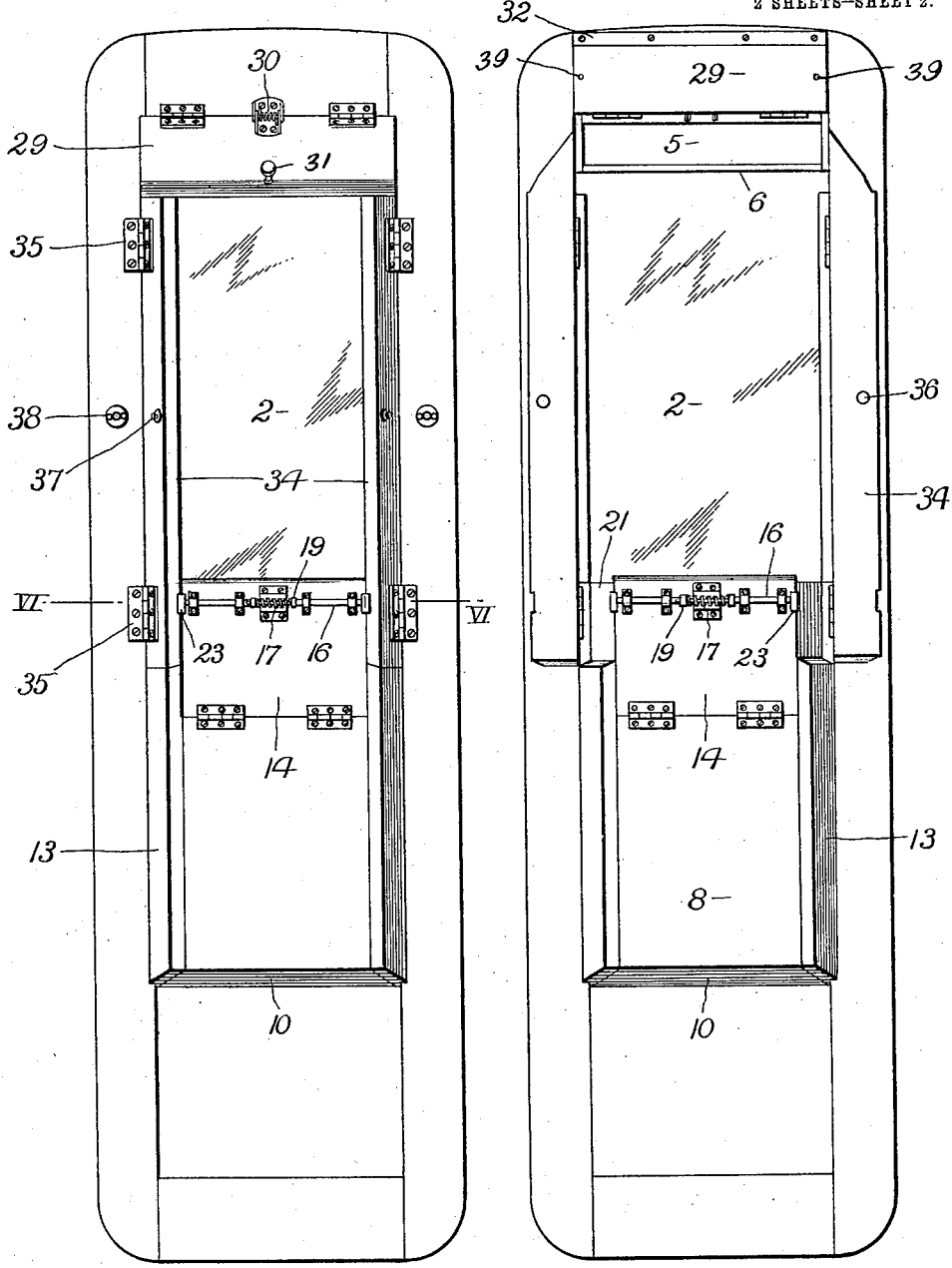

T. CARENCE.
MEANS TO PREVENT CONDENSATION OF WATER ON GLASS WINDOWS.
APPLICATION FILED MAY 15, 1912.
1,073,091. Patented Sept. 16, 1913.
2 SHEETS—SHEET 1.
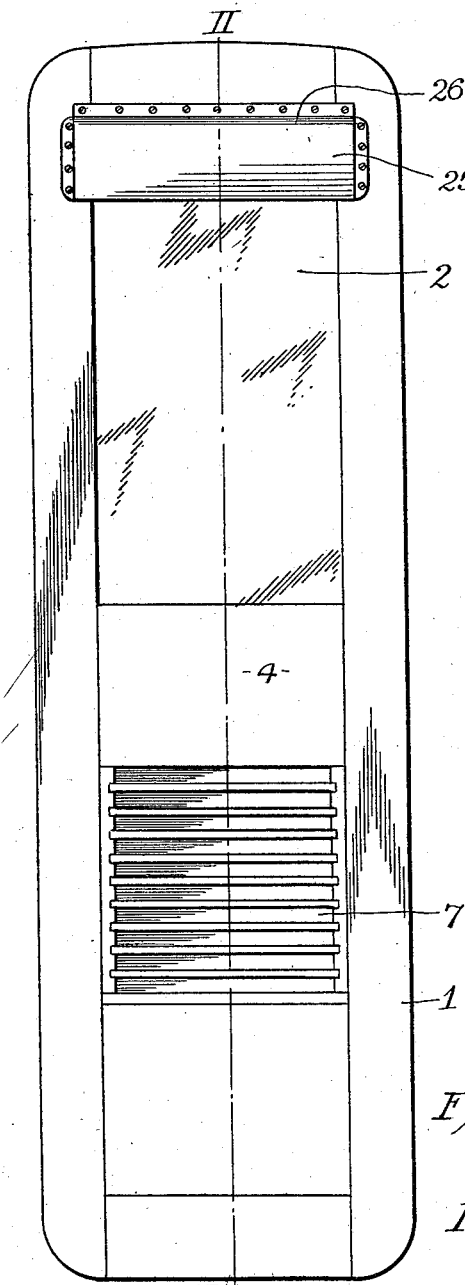
Fig. 1.
Fig. 3.
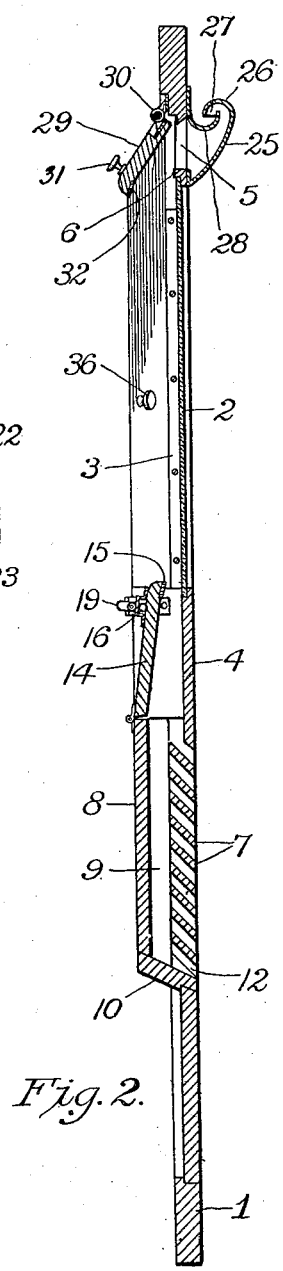
Fig. 2.
Fig. 6.
Witnesses:
R. Hamilton
E. C. Lillian
Inventor:
Thomas Carence
By F. G. Fischer, Atty.

T. CARENCE.
MEANS TO PREVENT CONDENSATION OF WATER ON GLASS WINDOWS.
APPLICATION FILED MAY 15, 1912.

1,073,091. Patented Sept. 16, 1913.
2 SHEETS—SHEET 2.

Witnesses:
R. E. Hamilton
E. C. Lillian

Inventor,
Thomas Carence
By F. G. Fischer,
atty.

UNITED STATES PATENT OFFICE.

THOMAS CARENCE, OF KANSAS CITY, MISSOURI.

MEANS TO PREVENT CONDENSATION OF WATER ON GLASS WINDOWS.

1,073,091.   Specification of Letters Patent.   Patented Sept. 16, 1913.

Application filed May 15, 1912. Serial No. 697,590.

*To all whom it may concern:*

Be it known that I, THOMAS CARENCE, a citizen of the United States, residing at Kansas City, in the county of Jackson and State of Missouri, have invented certain new and useful Improvements in Means to Prevent Condensation of Water on Glass Windows, of which the following is a specification.

This invention relates to devices for preventing the condensation of water upon the inner surfaces of glass windows of locomotive cabs, motor driven cars, and the like.

It is well known that in locomotive cabs in cold weather, the inner faces of the lookout windows quickly become fogged by condensation thereon from the moist atmosphere in the cab; thereby necessitating the very frequent wiping of the glass to remove the deposit in order that the engineer's view of signals be unobstructed. The same conditions prevail, of course, in the motorman's compartments of electrically driven locomotives and electrically driven passenger cars.

The object of this invention is to keep such lookout windows clear and dry, automatically, and especially in cold weather or at high altitudes where the temperature is always low.

In order that the invention may be fully understood, reference will now be made to the accompanying drawings, in which:

Figure 1 is an outside elevation of a locomotive-cab window provided with my improvements. Fig. 2 is a vertical section on line II—II of Fig. 1. Fig. 3 is a detail view. Fig. 4 is an inside elevation showing the air-channel walls in closed position. Fig. 5 is an inside elevation showing said guides in open position. Fig. 6 is a horizontal section on line VI—VI of Fig. 4.

1 designates the frame of a front cab-window, which frame may be of any usual construction.

2 designates the glass-pane, which is non-slidably mounted as shown on Fig. 2, and held in its seat by strips 3. Its lower edge rests upon a crosspiece 4, and its upper edge stops short of the top of frame 1 to provide an orifice 5, and is covered by a rabbeted strip 6.

The object of the construction to be described is to utilize the forward motion of the locomotive or car to cause a stream of air to flow over the inner face of the glass 2, and preferably in an upward direction.

To admit the air stream to the interior of the window, a series of horizontal, spaced, upwardly and inwardly-inclined slats 7, are fixedly mounted in the frame 1, a few inches below the bottom of the glass 2. The slats or deflectors 7 are adapted to admit air at an upward angle into a shallow casing 8, constructed behind said slats and spaced therefrom, providing a chamber 9. The casing has an inclined bottom 10 upon which cinders fall and from which they are discharged by the opening 12. Said casing and chamber have closed sides 13.

Hinged to the top of the casing 8 is a valve-plate 14, which is practically an extension of said casing. The inner edge of valve-plate 14 is arranged to be movable into contact with the glass 2 and its contacting part is lined with a strip 15 of soft rubber or felt, adapted to prevent the passage of air between the parts at times. The valve-plate 14 is provided with two latch-bolts 16, which are pressed in opposite directions by a spring 17, mounted on a rod 18 that passes through lugs 19 on the respective latch-bolts, being fixedly held in one lug and slidable in the other. Any preferred spring latch construction may be employed. The latch-plates 20 are fastened to the inner sides of two blocks 21, whose position is shown by Figs. 5 and 6. Said blocks extend down in contact with the inside faces of the sides 13 of casing 8 and are secured thereto. Their upper ends are about the height of the top of the valve-plate 14. Said latch-plates 20 are each provided with four latch-holes 22 and with a lug 23. The holes 22 are positioned to receive the latch-bolts 16 in four different positions of the valve-plate, and the lugs 23 prevent said plate from opening too far by acting as stops for the ends of latch-bolts 16. The latch-bolts are releasable by drawing their lugs 19 together, said lugs also serving as handles by which the valve-plate is adjustable.

To conduct the ascending air stream to the outer air again, the slot-shaped orifice 5 is provided at the top of the glass. Said orifice is protected exteriorly by a sheet-metal hood 25, having an arched spout 26 provided with a downwardly opening vent 27, which prevents the entrance of rain, cinders, etc., in connection with a trough 28, which discharges rain water at its ends. In order that the orifice 5 may be closed when so desired, a lid 29 adapted to cover same is provided. This lid is hinged to the top rail of the frame 1 and is provided with a closing spring 30 and a knob 31. Its lower edge, that can touch the glass 2, is lined with a strip 32 of soft rubber or the like. This lid is shown as turned up, on Fig. 5, simply to expose the orifice 5, but when in use it will be in the position shown on Fig. 2.

In order to cause the ascending stream of air to pass closely to the glass (so as to more effectively serve its purpose) a pair of lateral air-stream walls 34 are provided. As shown, these are constructed as wood strips, mounted on the frame 1 by hinges 35, and in their normal position are inwardly inclined, as is shown in section on Fig. 6. The side pieces 13 therebelow are similarly inclined. The hinged walls 34 are provided with handle knobs 36 and with stud fastener members 37. To receive the latter and hold the walls from rattling when open, socket fastening members 38 are provided on the frame 1.

The inner face of the lid 29 is provided with two small projecting pins 39, that are so located as to engage the outer faces of the hinged walls 34 when the latter are in their normal position and the former is closed down upon them. The pins 39 then hold the walls in position by preventing the latter being turned on their hinges.

The operation will be substantially as follows: When the outside temperature is warm or moderate, the valve-plate 14 is placed in its extreme closed position and will be held there by the latch bolts 16. This will prevent the upflow of outside air between said plate and the glass 2. The hinged air-stream walls 34 are laid back as seen on Fig. 5, and will be held there by the fasteners 37 and 38. The lid 29 will be pressed by its spring 30 against the top of the glass 2, thus closing the orifice 5. When running in cold weather or in high altitudes, the valve-plate 14 is opened at the discretion of the operator, being held at the desired point by the latch-bolts; the hinged walls 34 are turned to their normal position, and their upper ends then hold the lid 29 in open position. As the engine or car moves forward, air will be forced inwardly between the slats 7, upwardly between plates 4 and 14, along the surface of the glass 2, evaporating any water that may have condensed thereon, and passing out through orifice 5 and spout 26. The rearward and downward curvature of said spout causes a partial vacuum to form thereabove, which vacuum draws air from within the cab and through the hood 25.

Having thus described my invention what I claim and desire to secure by Letters Patent, is:

1. In combination with a window and its frame, an air casing communicating with and located below the window in spaced relation thereto, a valve hingedly connected to the upper end of the air casing and having its free end for engagement with the window, and a vertical strip at each side of the frame, each strip having its outer side hinged to the adjacent side of the frame and having its free inner side extending inwardly toward the center of the window in inclined relation to the latter to deflect the air toward the center of the window.

2. In combination with a window and its frame, the frame having an opening located below the window, a vertical strip at each side of the frame, each strip having its outer side connected to the adjacent side of the frame and having its free or inner side extending inwardly toward the center of the window in inclined relation to the latter to deflect the air toward the center of the window.

3. In combination with a window and its frame, the frame having an opening located above the window, a vertical strip at each side of the frame, each strip having its outer side connected to the adjacent side of the frame and having its free or inner side extending inwardly toward the center of the window in inclined relation to the latter to deflect the air toward the center of the window, and a closure for said opening, said closure when in open position seating on the upper ends of said strips and being held by the latter in open position.

In testimony whereof I affix my signature, in the presence of two witnesses.

THOMAS CARENCE.

Witnesses:
F. G. FISCHER,
E. C. LILLIAN.

Copies of this patent may be obtained for five cents each, by addressing the "Commissioner of Patents, Washington, D. C."